United States Patent [19]

Shibuya

[11] Patent Number: 4,742,453
[45] Date of Patent: May 3, 1988

[54] PIPELINE-CONTROLLED INFORMATION PROCESSING SYSTEM FOR GENERATING UPDATED CONDITION CODE

[75] Inventor: Toshiteru Shibuya, Tokyo, Japan
[73] Assignee: NEC Corporation, Tokyo, Japan
[21] Appl. No.: 627,615
[22] Filed: Jul. 3, 1984
[30] Foreign Application Priority Data

Jul. 6, 1983 [JP] Japan ................................ 58-122682

[51] Int. Cl.$^4$ .............................................. G06F 9/38
[52] U.S. Cl. .................................................. 364/200
[58] Field of Search ... 364/200 MS File, 900 MS File
[56] References Cited

U.S. PATENT DOCUMENTS

| | | | |
|---|---|---|---|
| 3,881,173 | 4/1975 | Larsen et al. ...................... | 364/200 |
| 4,133,030 | 1/1979 | Huettner .............................. | 364/200 |
| 4,532,589 | 7/1985 | Shintani et al. ..................... | 364/200 |
| 4,578,750 | 3/1986 | Amdahl et al. ..................... | 364/200 |

*Primary Examiner*—Archie E. Williams, Jr.
*Assistant Examiner*—Emily Y. Chan
*Attorney, Agent, or Firm*—Schwartz, Jeffery, Schwaab, Mack, Blumenthal & Evans

[57] ABSTRACT

The system includes a fetching circuit which sequentially fetches instructions to be executed. Certain of the instructions require that a predetermined condition code be present prior to being executed and certain of the instructions cause a condition code to be generated as a result of their execution. Condition code generators are provided for generating condition codes in response to execution of the instructions causing generation of condition codes. A circuit is also provided which is responsive to the sequentially fetched instructions for individually determining which of the instructions is to cause generation of a condition code, and which of the condition code generators is to generate a condition code for each of the determined instructions. The determined condition code generators are monitored, and a decision is made as to when a valid condition code has been generated by the monitored generator. A signal is produced when a valid condition code is generated. A decision circuit is connected to the fetching circuit for deciding which of the instructions requires the presence of a condition code prior to being executed. The decision circuit is connected to receive the signal indicative of a generated valid condition code, and is connected to inhibit the fetching circuit when a next sequential instruction requires the presence of a valid condition code and the signal is not present.

13 Claims, 9 Drawing Sheets

PIPELINE-CONTROLLED INFORMATION PROCESSING SYSTEM FOR GENERATING UPDATED CONDITION CODE

BACKGROUND OF THE INVENTION

The present invention relates to a pipeline-controlled type information processing system (PIP system).

Generally, in a PIP system, the success/failure of branching is determined at the time of execution of a conditional branch instruction in response to the end of execution of an instruction immediately before the conditional branch instruction and by referring to a condition code after the execution of the immediately preceding instruction. For high-speed processing of a conditional branch instruction, therefore, it is a primary requisite that the condition code to be referred to be determined within a short period of time.

A technique for fast determination of a condition code is disclosed in the U.S. Pat. No. 3,881,173. In accordance with the disclosed technique, fast condition code determination is achieved by use of specially designed hardware which quickly calculates a condition code only prior to execution of an operation, which should occur during the execution of an operation instruction for updating the condition code. Such an implementation, however, is not applicable to a PIP system in which an operation instruction cannot quickly determine only a condition code before execution of the operation or, if this can be done, requires a considerable amount of hardware for the determination.

A system applicable even to such a system is described in the Japanese Patent Publication No. 2741/1981. This system is based on the fact that the instructions include one which does not update a condition code. That is, the system is furnished with hardware responsive to whether or not a specific one of the instructions, preceding a conditional branch instruction which updates a condition code last, has completed an operation phase. A control in this system occurs such that a response is provided, not to the end of execution of an instruction just before a conditional branch instruction, but, to the end of execution of an instruction which determines a condition code to be referred to in response to a conditional branch instruction, thereby speeding up the determination of success/failure of a conditional branch instruction.

Another PIP system which achieves an improvement over the above-described technique, is disclosed in the Japanese Patent disclosure No. 158745/1983. What underlies this system is the fact that address calculation associated with memory operands or access to a cache memory is needless when an instruction for causing an operation between general purpose registers is to be executed. The system includes a circuit for generating a condition code for an instruction adapted to cause an operation between general purpose registers in a memory operand address calculation phase, and a circuit for generating a condition code for a shift instruction adapted to shift data stored in a general purpose register by a quantity indicated by a result of address calculation in a cache memory access phase. Determination of a condition code in the operation instruction or the shift instruction occurs before that of a condition code associated with an instruction other than the two which cause a memory operand operation. The system further includes, in the respective phases in the pipeline processing procedure, means for indicating whether or not an instruction in the associated phase is an instruction which updates a condition code, means for indicating whether or not a condition code has already been determined, a register for holding the determined condition code, and means for deciding, in response to outputs of those three means, whether or not one of instructions preceding a conditional branch instruction which updates a condition code last, has determined the code. This further promotes fast determination of success/failure of branching. Nevertheless, the proposed system is not applicable to a system having a plurality of operation pipelines or a system, if with a single operation pipeline, having a plurality of circuits capable of determining condition codes in the same phase in the pipeline processing procedure.

SUMMARY OF THE INVENTION

It is, therefore, an object of the present invention to provide a PIP system which solves the various problems discussed above and achieves fast execution of condition code reference instructions.

According to one aspect of the invention, there is provided a PIP system which compries: a plurality of condition code generation units, each having a counter section and an operating section for operating the counter section in the event of generation of a condition code; a condition-code-updating instruction discrimination unit for discriminating between said condition code generation units to determine, in response to every instruction, which one of the condition code generation units is to generate a condition code, holding a result of the determination, and operating the counter section associated with the result of the discrimination; and a condition code determination decision unit for monitoring counts held by the plurality of counter sections and the result of the discrimination to produce a signal indicative of a determined state of a condition code and a condition code.

With the above construction, the system of the present invention is capable of seeing whether or not a condition code has been determined by constantly monitoring a condition code generation mechanism which is used by the latest condition code update instruction being executed on the pipeline. As a result, a subsequent condition-code-reference-instruction need not wait the determination of the condition code of the previous instruction executed.

BRIEF DESCRIPTION OF THE DRAWINGS

The present invention will be described in detail with reference to the accompanying drawings in which.

In the drawings, the same reference numerals denote the same structural elements.

DESCRIPTION OF THE PREFERRED EMBODIMENT

Figure 1:
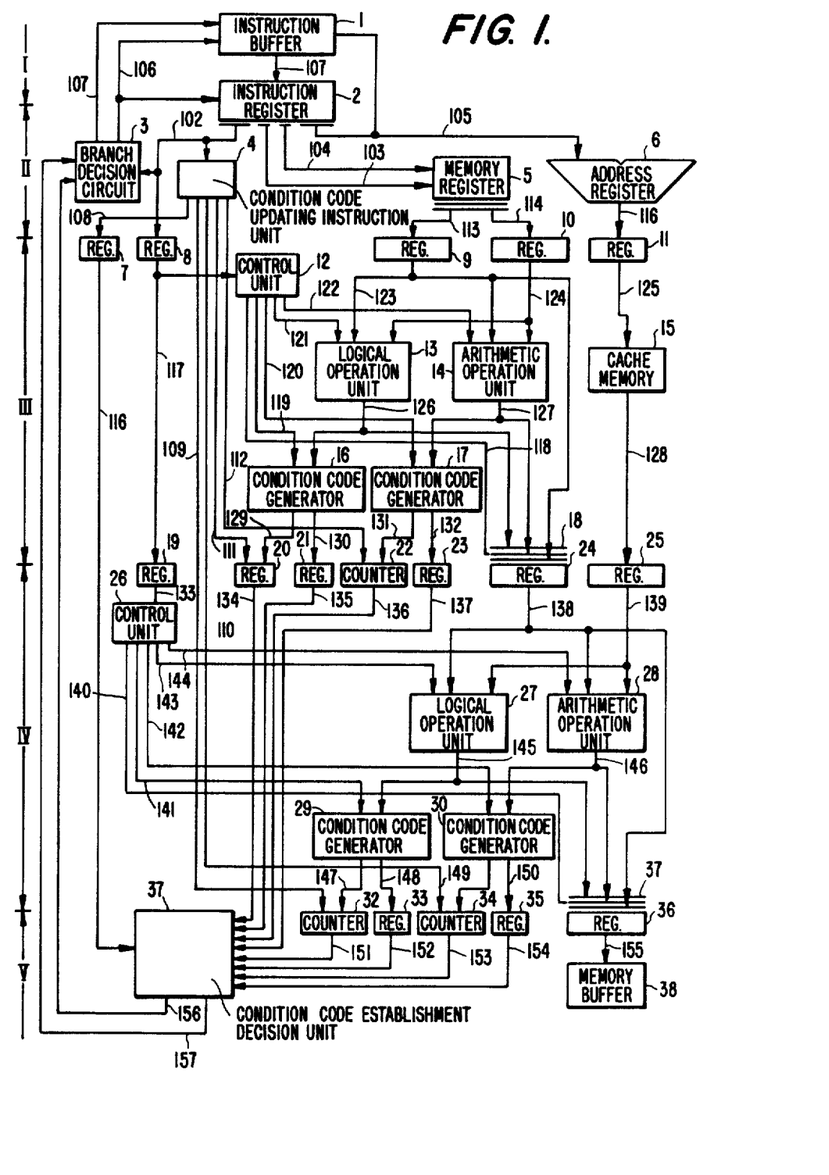
FIG. 1 shows an embodiment of the present invention.

Referring to FIG. 1, a PIP system embodying the invention comprises an instruction fetching section (1 and 2) for performing an instruction fetching operation in phase I; a fetching, calculation and decision section (3, 4, 5, and 6) for performing register operand fetching, memory operand address calculating and conditional branch instruction deciding operations in phase II; an operand fetching and execution section (7–17) for performing a fetching operation for memory operands and executing an operation for register operands only in phase III; an execution section (19–30) for performing the execution of operations for the memory operand and the register operand in phase IV; and a store section (31–38) for storing a result of the operation for the memory operand and the register operand in phase V.

In detail, the embodiment of the invention comprises an instruction buffer 1 for supplying instruction words; an instruction register 2; a register memory 5 including general purpose registers which are capable of reading out two independent words at once; an address adder 6 for calculating addresses of memory operands; a register 8 for holding an instruction code stored in the instruction register 2; registers 9 and 10 each for holding a content read out of the register memory 5; a register 11 for holding a result of an address addition from the adder 6; a logical operation unit 13 for executing a logical operation on contents stored in the registers 9 and 10; an arithmetic operation unit 14 for executing an arithmetic operation on contents stored in the registers 9 and 10; a cache memory 15 which is accessed based on an address stored in the register 11; a condition code generation unit 16 for generating a condition code in response to an output of the unit 13; a code generation unit 17 for generating a condition code in response to an output of the unit 14; a selector 18 for selecting an output of the unit 13 when an instruction to be processed in phase III is a logical operation instruction which does not use any memory operand, an output of the unit 14 when it is an arithmetic operation instruction which does not use a memory operand, and an output of the register 9 when it is an instruction which uses a memory operand; a control unit 12 for applying control signals to the units 13, 14, 16, 17, and 18 as instructed by an instruction code stored in the register 8; a counter 20 which is decreased by 1 (one) in response to a command from the unit 16; a register 21 for holding a condition code output from the unit 16; a counter 22 which is decreased by 1 in response to a command from the unit 17; a register 23 for holding a condition code from the unit 17; a register 24 for holding an output of the selector 18; a register 25 for holding an output of the cache memory 15; a register 19 for receiving an instruction code stored in the register 8; a logical operation unit 27 for executing a logical operation on the contents of the registers 24 and 25; an arithmetic operation unit 28 for executing an arithmetic operation on the contents of the registers 24 and 25; a condition code generation unit 29 for generating a condition code in response to an output of the unit 27; a condition code generation unit 30 for generating a condition code in response to an output of the unit 28; a selector 31 for selecting an output of the unit 27 when an instruction to be processed in phase IV is a logical operation instruction which uses a memory operand, an output of the unit 28 when it is an arithmetic operation instruction which uses a memory operand, and an output of the register 24 when it is an instruction which does not use a memory operand; a control unit 26 for supplying control signals to the unit 27, 28, 29, 30, and selector 31 in response to an instruction code held by the register 19; a counter 32 which decrements by 1 in response to a command from the unit 29, a register 33 for holding a condition code from the unit 29, a counter 34 is decreased by 1 in response to a command from the unit 30, a register 35 for holding a condition code generated by the unit 30; a register 36 for holding an output of the selector 31; a memory buffer 38 for storing a operation result from the register 36; a condition code-updating-instruction discrimination unit 4; a register 7 for storing a result of a discrimination performed by the unit 4; a condition-code-establishment decision unit 37; and a branch decision circuit 3 for determining a branching direction in a conditional branch instruction.

Figure 2:
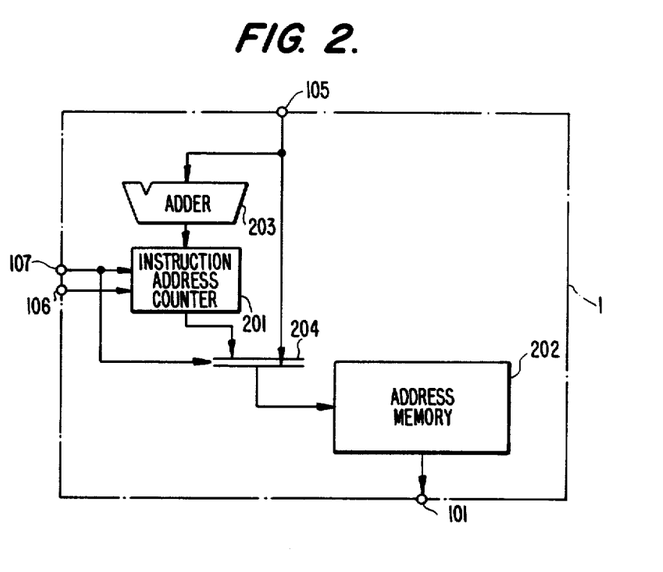
FIG. 2 is a detailed block diagram of an instruction buffer 1 shown in FIG. 1.

Referring to FIG. 2, the instruction buffer 1 includes an instruction address counter 201 for holding an instruction address, a memory 202 for producing the content in the address which is specified by an address from the counter 201, an adder 203 for producing 8-bit data on a line 105 plus (+) 1, and a selector 204 for selecting 8-bit data on the line 105 or an 8-bit data output from the counter 201. The counter 201 is increased by 1 for each cycle. However, while a hold command applied from the unit 3 to the counter 201 via a line 106 remains at logical "1", the counter 201 is not increased and, instead, holds the same count. When a branch command also applied to the counter 201 from the circuit 3 via a line 107 has become logical "1", the counter 201 fetches an address output from the adder 203. An instruction address from the register 2 is then increased by 1 by the adder 203 so that the consequent addition result is stored in the counter 201 as an instruction address. Further, when the information processing system is reset, the counter 201 holds "0" as an instruction address. The selector 204 selects data on the line 105 when the branch command on the line 107 is at logical "1", and an output of the counter 201 when it is at logical "0".

Figure 3:
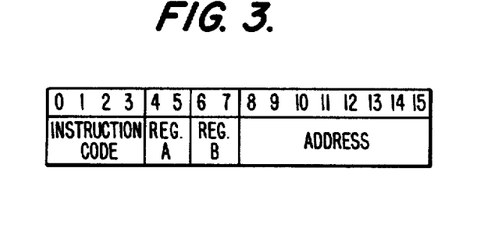
FIG. 3 shows a format of instructions applicable to the embodiment of FIG. 1.

Referring to FIG. 3, there is shown a format of instructions applicable to the PIP system of the invention. Each instruction word is made up of sixteen bits, i.e., bits 0–3 forming an instruction code field, bits 4 and 5 forming a register A field, bits 6 and 7 forming a register B field, and bits 8–15 forming an address field.

The instructions applicable to the embodiment comprise instructions for undating a condition code, conditional branch instructions which refer to a condition code, and unconditional branch instructions. These instructions and operations caused thereby are shown in Table 1.

TABLE 1

| INSTRUCTION CODE | INSTRUCTION | OPERATION |
|---|---|---|
| 0000 | ADDR | Content of a general purpose register designated by register A field and that of a general purpose register designated by register B field are arithmetically added, and the result is stored in a register specified by register A field. If the result is positive in sign, the condition code is set to logical "1", if negative, then to logical "0". |
| 0001 | SUBR | Content of a general purpose register designated by register B field is subtracted from that of a general purpose register designated by register A field, and the result is stored in a register designated by register A field. If the result is positive, the condition code is set to logical "1"; if negative, then to logical "0". |
| 0010 | ANDR | Logical product (AND) of a content in a general purpose register designated by register A field and that of a general purpose register designated by register B field is stored in a register designated by register A field. If the result is zero, the condition code is set to logical "0"; if not zero, then to logical "1". |
| 0011 | EORR | Exclusive OR (EOR) of a content in a general purpose register designated by register A field and a content in a general purpose register designated by register B field is stored in a register designated by register A field. If the result is zero, the condition code is set to logical "0"; if not zero, then to logical "1". |
| 0100 | ADDX | The same operation as one caused by ADDR instruction occurs except for the use of the content of a memory designated by address field instead of the content of a general purpose register designated by register B field. |
| 0101 | SUBX | The same operation as one caused by SUBR instruction occurs except for the use of the content of a memory designated by address field instead of the content of a general purpose register designated by register B field. |
| 0110 | ANDX | The same operation as one caused by ANDR instruction occurs except for the use of the content in a memory designated by address field instead of the content of a general purpose register designated by register B field. |
| 0111 | EORX | The same operation as one caused by the EORR instruction occurs except for the use of the content of a memory designated by address field instead of the content of a general purpose register designated by register B field. |
| 1000 | BCX | When the condition code is "0", the operation advances to the next instruction; when it is "1", branch occurs to an address designated by address field and the condition code is not changed. |
| 1001 | BX | Branch to an address designated by address field occurs, with the condition code unchanged. |

Figure 4:
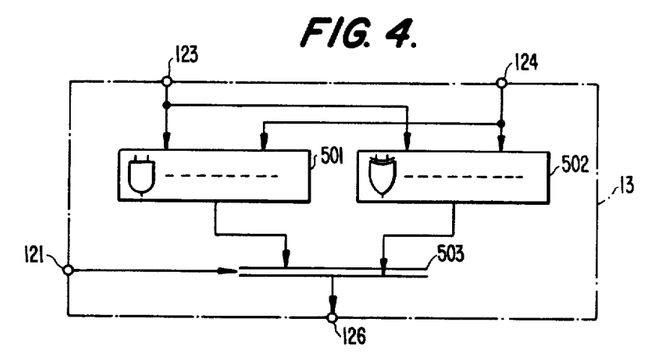
FIGS. 4 to 12 are detailed diagrams for showing main structural elements of the embodiment of FIG. 1.

Referring to FIG. 4, the logical operation unit 13 comprises a circuit 501 for providing an AND operation of corresponding bits in the 16-bit data which appear on lines 123 and 124, a circuit 502 for providing an EOR operation of the 16-bit data, and a selector 503 for selecting an output of the circuit 501 if the control signal supplied thereto from the controller 12 via a line 121 is "0" and an output of the circuit 502 if it is "1". The logical operation unit 27 has the same construction as described with reference to FIG. 4.

Figure 5:
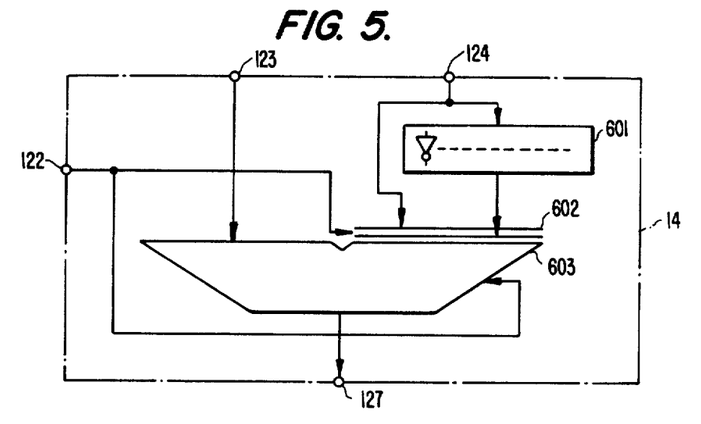

In FIG. 5, the arithmetic operation circuit 14 comprises a circuit 601 for providing a NOT operation of 16-bit data on the line 124, a selector 602 for selecting data on the line 124 if the control signal supplied thereto from the controller 12 via a line 122 is "0" and data output from the circuit 601 if it is "1", and an adder 603 which responds to the "0" control signal on the line 122 for producing a 16-bit sum by adding 16-bit data on the line 123 and 16-bit data output from the selector 602 and, then, responds to the "1" control signal for providing an arithmetic sum of the data on the line 123 and the output data of the selector 602, plus 1.

The construction of the arithmetic operation unit 28 is identical with the one shown in FIG. 5.

Figure 6:
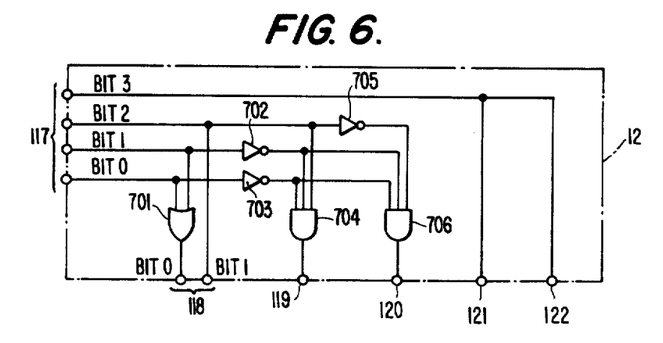

In FIG. 6, the controller 12 generates, from a 4-bit instruction code held by the register 8 and supplied thereto via a lines 117, a 2-bit control signal 118 for controlling the selector 18, a control signal 119 for the generator 16, a control signal 120 for the generator 17, a control signal 121 for the unit 13, and a control signal 122 for the unit 14. The control unit 12 comprises a 2-input OR gate 701 for providing an OR operation, NOT gates 702, 703 and 705 each for providing a NOT operation, and 3-input AND gates 704 and 706 each for providing an AND operation.

The selector 18 selects 16-bit data on a line 127 in response to "0" of the 2-bit control signal 118, 16-bit data on a line 126 in response to "1" of the control signal, and 16-bit data on the line 123 in response to "2 or 3" of the signal 118.

Figure 7:
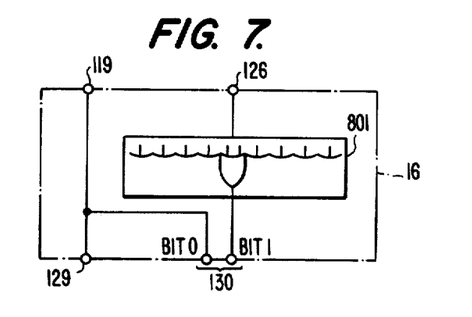

Referring to FIG. 7, the condition code generator 16 generates a 2-bit control signal 130 to be supplied to the register 21 for holding a condition code, and a control signal 129 to be supplied to the counter 20. The bit "0" on a signal line 130 is a set command signal to the register 21, and the bit "1" is set data which is a condition code. The generator 16 includes a 16-input OR gate 801 for providing an OR operation of 16-bit data appearing on a line 126.

The condition code generator 29 is constructed in the same manner as shown in FIG. 7.

Figure 8:
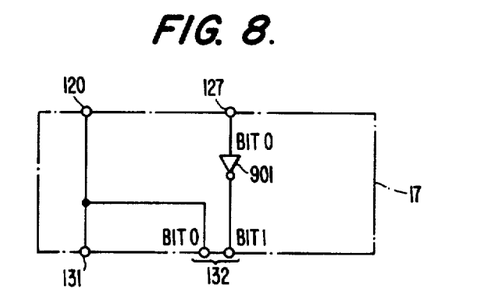

Referring to FIG. 8, the condition code generator 17 generates a 2-bit control signal 132 to be supplied to the register 23 for holding a condition code, and a control signal 131 to be supplied to the counter 22. The bit "0" on a line 132 is a set command signal to the register 23, while the bit "1" is set data which is a condition code. The condition generator 17 includes a NOT gate for providing a NOT operation of the bit "0" of 16-bit data which appears on the line 127.

The condition code generator 30 has the same construction as one shown in FIG. 8.

Figure 9:
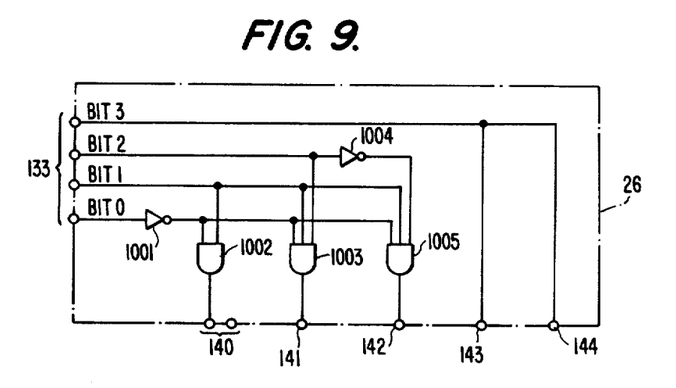

Referring to FIG. 9, the controller 26 is shown in detail. The controller 26, in response to an instruction code held by the register 19 and fed thereto via a line 133, generates a 2-bit control signal 140 for controlling the selector 31, a control signal 141 for the generator 29, a control signal 142 for the generator 30, a control signal 143 for the unit 27, and a control signal 144 for the unit 28. The control circuit 26 is made up of NOT gates 1001 and 1004 for providing a NOT operation, an AND gate 1002 for providing an AND operation of two inputs, and AND gates 1003 and 1005 for providing an AND operation of three inputs. The selector 31 selects 16-bit data on a line 138 in response to "0 or 1" of the 2-bit control signal 140, 16-bit data on a line 146, in response to "2" of the signal 140, and 16-bit data on a line 145 in response to "3" of the signal 140.

Figure 10:
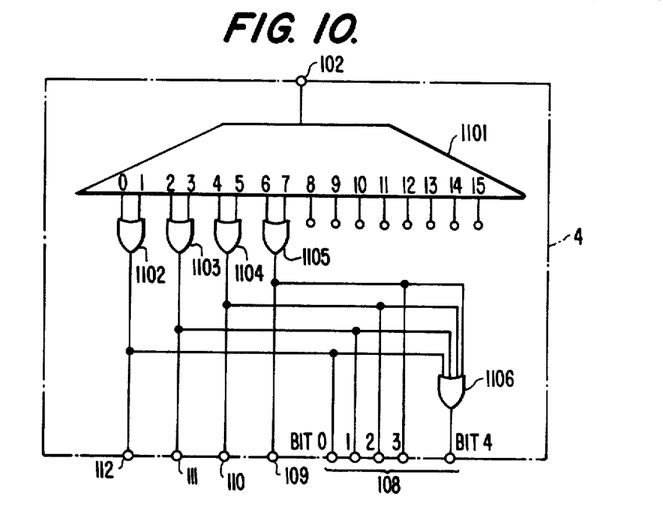

Referring to FIG. 10, the condition-code-updating instruction discrimination unit 4 is adapted to determine whether or not an instruction stored in the instruction register is designating updating the condition code, in response to a 4-bit instruction code given via a line 102. If the result is indicative of updating, the discriminator 4 determines which one of the condition code generators should generate a condition code, and designates the counter paired with the condition code generator to increment by 1 while, at the same time, causing the register 7 to store the result of the determination. Appearing on lines 109, 110, 111 and 112 are increment signal for the counters 32, 34, 20, and 22 associated respectively with the condition code generators 29, 30, 16, and 17. Appearing on a 5-bit line 108 is a control signal for the register 7. Bits 0-3 represent set data, or the result of discrimination, while bit 4 is a set command signal for the register 7. The discrimination circuit 4 comprises a binary decoder 1101 for decoding a 4-bit signal to sixteen bits, 2-input OR gates 1102, 1103, 1104 and 1105, and a 4-input OR gate 1106. Each of the counters 20, 22, 32 and 34, which consists of a 2-bit counter having an increment command input and a decrement command input, is increased by one in response to an increment command, decreased by one in response to a decrement command, and maintains the existing count when both the command inputs are "1". When the information processing system in the embodiment is reset, the counters are caused to hold "0". Each of the registers 21, 23, 33 and 35 is a 1-bit register having a set command input terminal .and a set data input terminal. Each of the registers 21, 23, 33 and 35 fetches set data only when the set command is "1". When the system of the embodiment is reset, they are caused to hold "0". The register 7 functions in the same manner as any of the registers 21, 22, 33 and 35, holding 4-bit data therein.

Figure 11:
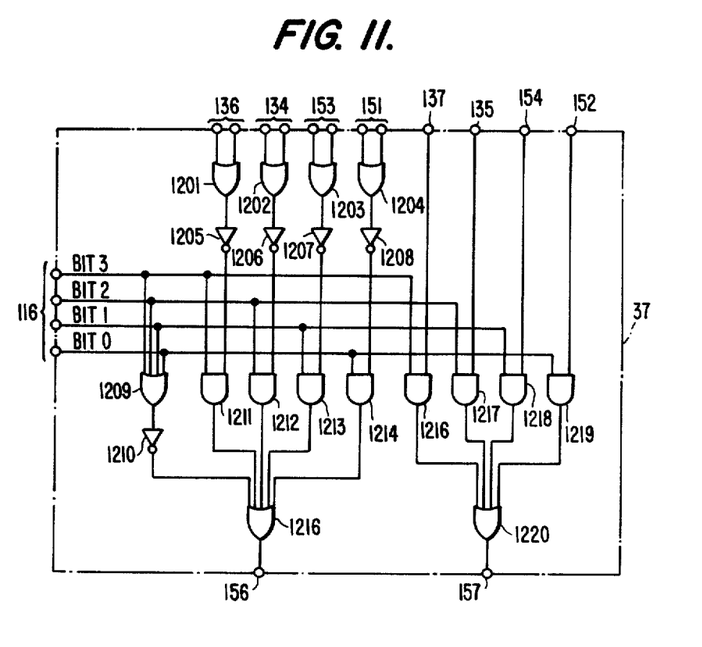

Referring to FIG. 11, the condition-code-establishment decision unit 37, in response to an output of the register 7 for holding the result of discrimination, identifies a condition code generator which is to be caused to generate a condition code by the latest condition code update instruction among the instructions being executed on the pipeline. Then, the decision unit 37 checks whether the condition code generator concerned has already generated a condition code, in response to contents of the counters 22, 20, 34 and 32. If the condition code generator has generated the condition code, the unit 37 selects a correct determined condition code. A condition-code-determination-indication-signal on a line 156 shows that a condition code has not been determined yet when it is "0" and has already been determined when it is "1". When a condition code has been made definite, the definite condition code is output on the line 157. The decision unit 37 comprises 2-input OR gates 1201, 1202, 1203 and 1204, NOT gates 1205, 1206, 1207, 1208 and 1210, 4-input OR gates 1209 and 1220, a 5-input OR gate 1215, and 2-input AND gates 1211, 1212, 1213, 1214, 1216, 1217, 1218 and 1219.

Figure 12:
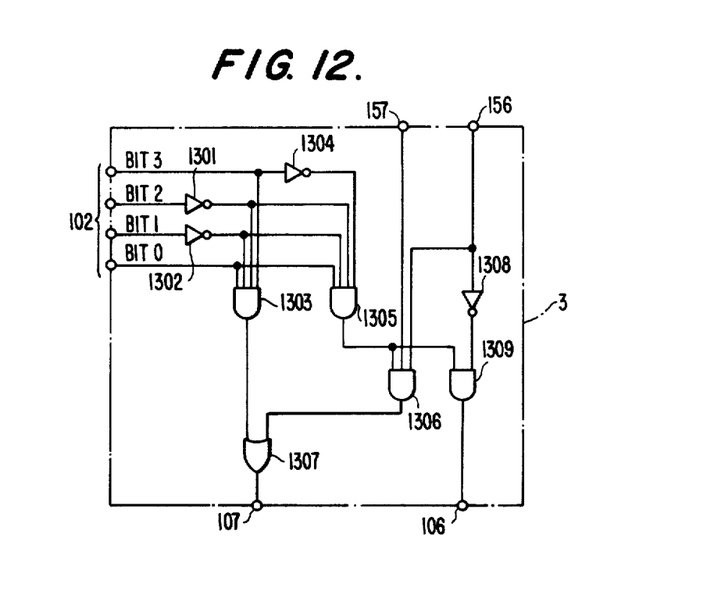

Referring to FIG. 12, the branch decision unit 3 determines whether a branch instruction is a conditional branch instruction or a unconditional branch instruction and, in the case of the unconditional branch instruction, the unit 3 delivers a branch command to the instruction buffer 1 via the line 107. In the case of a conditional branch instruction, the unit 3 delivers a branch command only if the condition-code-determination-indication signal on the line 156 indicates a definite condition code state and the condition code on the line 157 is "1". While a condition code has not been determined, the unit 3 delivers a hold command to the buffer 1 and instruction register 2 via the line 106 until a condition code becomes definite. The unit 3 comprises NOT gates 1301, 1302, 1303 and 1304, 4-input AND gates 1305 and 1306, a 2-input AND gate 1307, a 3-input AND gate 1308, and a 2-input AND gate 1309.

Figure 13:
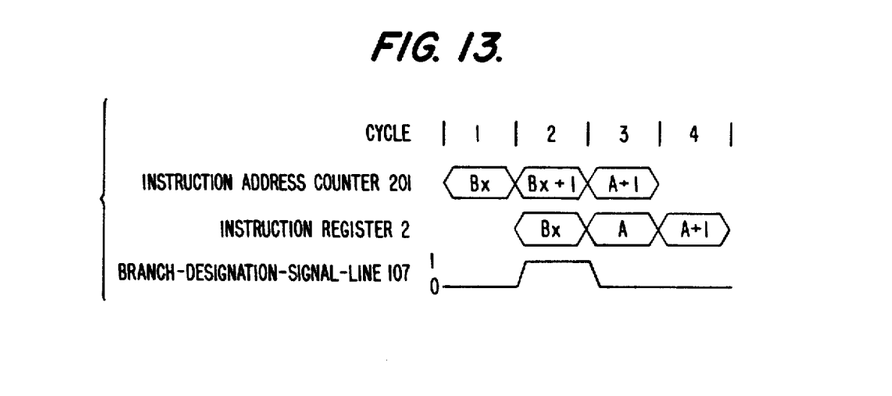
FIG. 13 is a timing chart representative of execution of an unconditional branch instruction used in the embodiment of FIG. 1.

An unconditional branch instruction is executed by the buffer 1, the register 2 and the unit 3 as represented in FIG. 13 in terms of time. As shown, in a cycle 1, the instruction address counter 201 indicates the address of an unconditional branch instruction BX. In a cycle 2, the instruction BX is set in the register 2, while the address BX+1, next in sequence to the instruction BX, is indicated by the counter 201. At the same time, the unit 3 decides that the instruction held by the register 2 is an unconditional branch instruction and, thereby, sends out a branch command to the line 107. As a result, in a cycle 3, the register 2 is loaded with a branch target instruction A associated with the instruction BX, and the instruction address counter 201 is loaded with an address A+1 of an instruction next to the branch target instruction A. In a cycle 4 next to the cycle 3, the register 2 is loaded with the instruction A+1 next to the branch target instruction A.

Figure 14:
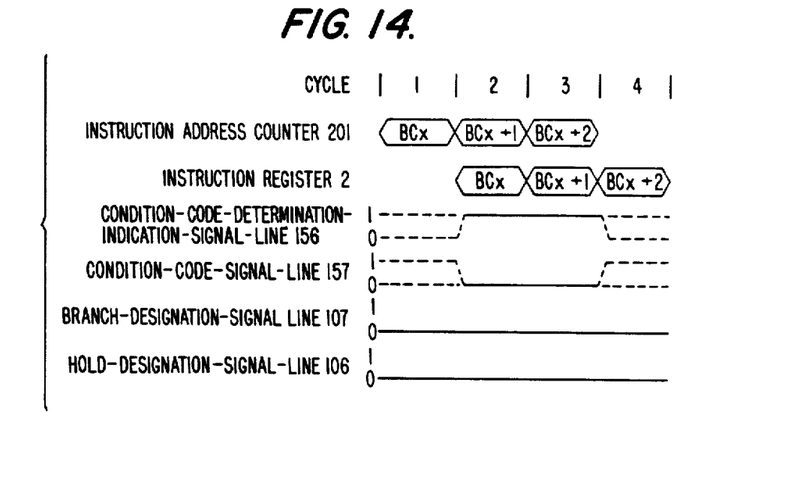
FIGS. 14 and 15 are timing charts each showing execution of a conditional branch instruction which conforms to a condition code.

A conditional branch instruction BCX is executed as represented in FIG. 14 with respect to time while a condition code has been determined as "0". Even though a conditional branch instruction BCX may be set in the register 2 in the cycle 2, no hold command appears inasmuch as the above-mentioned determination-indication-signal is "1". Also, no branch command is produced because the condition code is "0". Therefore, in the subsequent cycle 3, an instruction BCX+1 next to BCX is loaded in the register 2.

Figure 15:
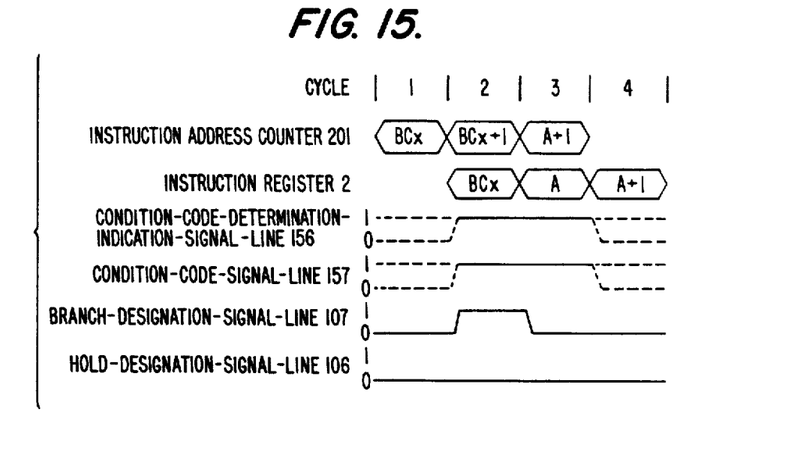

When the condition code has been determined as "1", the instruction BCX is executed as shown in FIG. 15. When the conditional branch instruction has been loaded in the instruction register 2 in the cycle 2, a hold command is not produced because the determination-indication-signal is "1". Since the condition code is "1", a branch command is delivered so that in the cycle 3 the register 2 is loaded with a branch target instruction A of BCX. The instruction address counter is loaded with the address of an instruction A+1 next to the branch instruction A.

Figure 16:
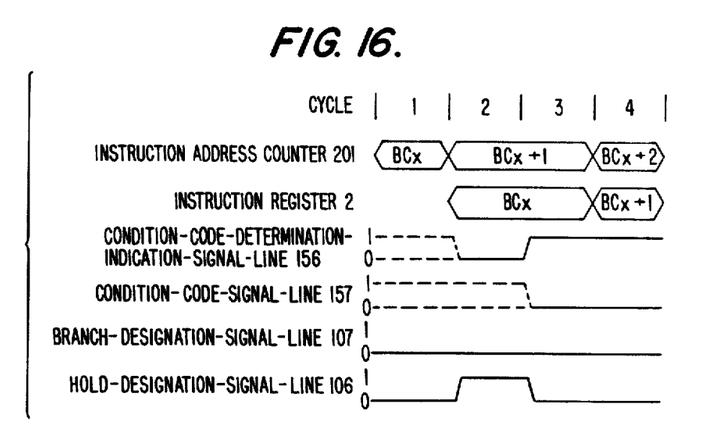
FIGS. 16 and 17 are timing charts each showing execution of a conditional branch instruction conforming to a state of a condition code which is set up as a result of awaiting determination of a condition code.

Referring to FIG. 16, there is shown with respect to time execution of the instruction BCX which occurs when the condition code is determined as "0" as a result of waiting for the determination. As soon as the instruction BCX is set in the register 2 in the cycle 2, the unit 3 develops a hold command because the determination-indication-signal is "0". This causes the counter 201 to maintain the address BCX+1 and the register 2 the address BCX, even in the next cycle 3. When a condition code has been determined to make the determination-indication-signal "1", the hold command becomes "0" so that the branch command becomes "0" due to the definite condition code "0". In the next cycle 4, therefore, branching is not performed, the register 2 is loaded with the address of an instruction of BCX+1, and the counter 201 is loaded with the address of an instruction of BCX+2.

Figure 17:
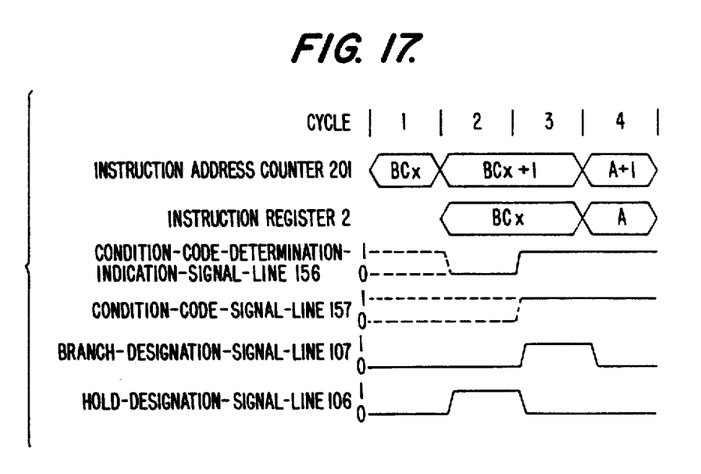

Referring to FIG. 17, there is shown a timing for executing a conditional branch instruction BCX when the condition code has been determined at "1" as a result of waiting. As soon as a conditional branch instruction BCX is loaded in the register 2 in the cycle 2, a hold command is delivered because the determination-indication-signal is "0". Therefore, even in the next cycle 3, the counter 201 holds the address of BCX+1 and the register 2, BCX. When the condition code has been determined as "1", the determination-indication-signal becomes "1" and the hold command "0". Since the condition code is "1", the branch command turns into "1" with the result that branching is executed. In the subsequent cycle 4, the instruction register 2 is loaded with an instruction A associated with the branch target, while the counter 201 is loaded with the address of A+1 which is next to the target instruction.

Each of the registers 8, 9, 10, 11, 19, 24, 25, and 36 shown in FIG. 1 is given input data cycle by cycle. The operation of this particular embodiment will be described in detail assuming, for example, the various instructions shown in Table 2.

TABLE 2

| INSTRUCTION A | ADDR | arithmetic addition instruction between general-purpose registers; condition-code-updating instruction |
|---|---|---|
| INSTRUCTION B | EORX | EOR instruction between general-purpose register and memory operand; condition-code-updating instruction |
| INSTRUCTION C | SUBX | arithmetic subtraction instruction for memory operand from general-purpose register; condition-code-updating instruction |
| INSTRUCTION D | ADDX | arithmetic addition instruction for general-purpose register and memory operand; condition-code-updating instruction |
| INSTRUCTION E | ANDR | AND instruction for general-purpose registers; condition-code updating instruction |
| INSTRUCTION F | BCX | conditional branch instruction by condition code; condition code not updated |

Figure 18:
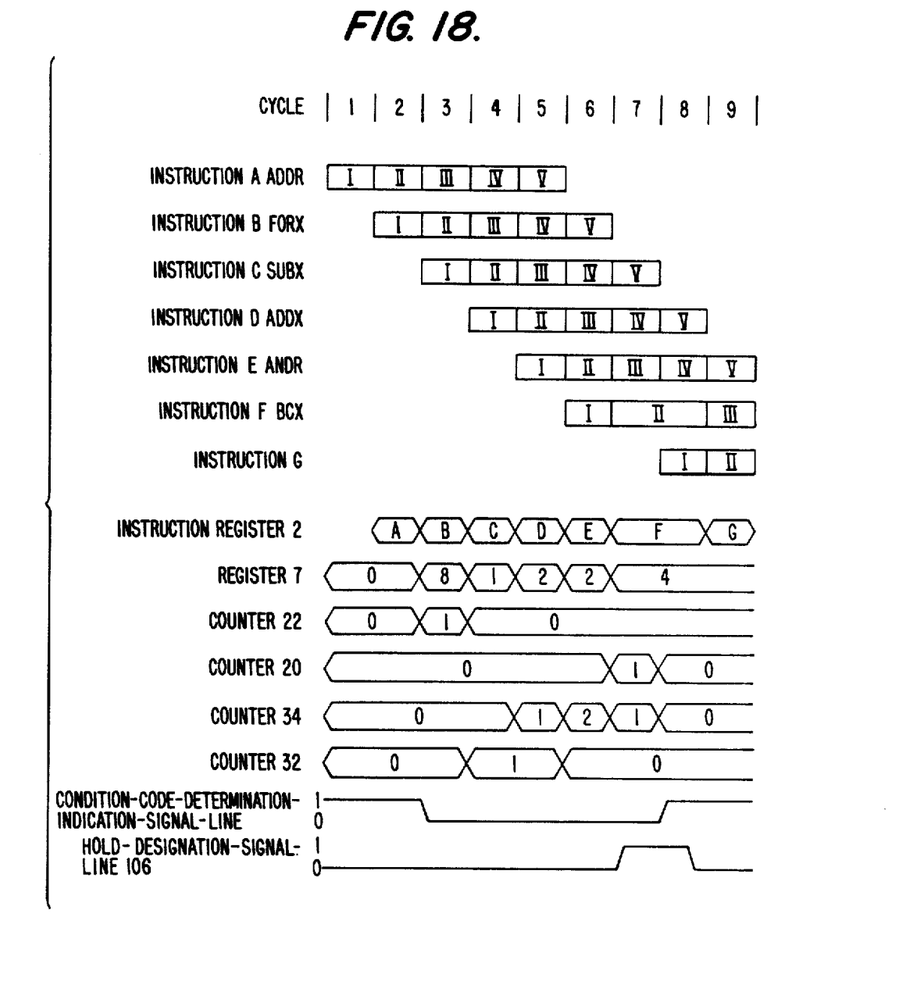
FIG. 18 is a timing chart representative of instruction executing phases and operating conditions of major units in the embodiment of FIG. 1.

Referring to FIG. 18, there is shown the flow of instructions occurring when a series of instructions indicated in Table 2 are executed, together with varying states of major blocks of FIG. 1 associated therewith. In FIG. 18, an instruction G represents an instruction resulting from a conditional branch operation as is effected by the instruction F.

Now, with reference to FIGS. 1 and 18, the details of operation of the embodiment will be described sequentially cycle by cycle.

(First Cycle)

The instruction A is fetched from the buffer 1.

(Second Cycle)

The instruction A is loaded in the register 2 while data stored in two general purpose registers by the instruction A are read out of the register memory 5. The condition-code-updating instruction discrimination unit 4 determines that the instruction A is the ADDR instruction for updating the condition code and, as a result of discrimination, delivers a load "8" command to the register 7 over the line 108 and an increment command to the counter 22 over the line 112.

The instruction B is fetched from the buffer 1.

(Third Cycle)

Binary "8" is written into the register 7, which is adapted to hold the result of discrimination, in response to the command which came in through the line 108. At the same time, "1" is loaded in the counter 22 in response to the increment command on the line 112. The condition-code-determination decision unit 37, in response to the data fed from the register 7 over the line 116, sees that an instruction for causing the generator 17 to generate a condition code exists on the pipeline. The unit 37 is informed of the fact that the generator 17 has not generated a condition code yet by the data "1" which is delivered thereto over the line 136 from the counter 22, which is associated with the generator 17. Then, the decision unit 37 applies "0" to the condition-code-determination-indication-signal in order to show that a condition code has not been determined yet.

Concerning the instruction A, data stored in the general purpose registers fetched from the register memory 5 are loaded respectively in the registers 9 and 10. The register 8 is loaded with an instruction code associated with the instruction A. The controller 12, in response to the instruction code applied thereto from the register 8 over the line 117, develops "0" on the line 122 to command the arithmetic operation unit 14 to perform an addition, develops "1" on the line 120 to command the generator 17 to generate of a condition code, and develops "0" on the line 118 to command the selector 18 to select of an output of the unit 14 which appears on the line 127. As a result, the data stored in the registers 9 and 10 are added by the unit 14 and the resultant sum is selected by the selector 18.

Responding to the sum on the line 127, the generator 17 generates a condition code and delivers it to the line 132 to instruct the register 23 to store the condition code while, at the same time, delivering a decrement command to the counter 22 over the line 131 to decrement it by 1.

The instruction B is loaded in the register 2. Data stored in a general purpose register designated by the instruction is read out of the memory register 5 to allow the adder 6 to perform address calculation for the memory operand. The condition-code-updating instruction discrimination unit 4 determines that the instruction B is the EORX instruction which updates the condition code and, as a result of the discrimination, delivers a load "1" command to the register 7 over the line 108 and an increment command to the counter 32 over the line 109 to increment it by 1.

The instruction C is fetched from the buffer 1.

(Fourth Cycle)

By the decrement command on the line 131, the counter 22 is decremented by 1 to "0". The register 23 is loaded with the condition code associated with the instruction A which was generated in the third cycle. The register 7 adapted to hold a descrimination result is loaded with "1" by the command on the line 108, while the counter 32 is incremented by the command on the line 109 to "1". The condition-code-establishment decision unit 37, based on the data stored in the register 7, recognizes that the latest instruction for updating the condition code after phase III on the pipeline is to cause the generator 29 to generate a condition code and, since the count of the counter 32 associated with the generator 29 is "1", sees that the condition code generator 29 has not generated a condition 29 has not generated a condition code yet, thereby delivering "0" to the condition-code-determination-indication-signal on the line 156.

The sum selected by the selector 18 is loaded in the register 24 under the control of the instruction A. Meanwhile, the instruction code of the instruction A is stored in the register 19 and the controller 26 develops "0" on the line 140. As a result, the selector 31 selects the result of operation associated with the instruction A which is set in the selector 24 and fed thereto via the line 138.

The data in the general purpose register read out of the register memory 5 are loaded in the register 9 under the control of the instruction B, while the address of a memory operand is loaded in the register 11. The cache memory 15 is accessed on the basis of an address of the register 11. The register 8 is loaded with an instruction code associated with the instruction B and the controller 12 develops "3" on the line 118, with the result that the selector 18 selects data stored in the register 9.

The instruction C is loaded in the register 2. Data stored in a general purpose register designated by the instruction and the address of the memory operand are read out on the lines 113 and 115, respectively. The discrimination unit 4 determines that the instruction C is the SUBX instruction for updating the condition code and, as a result of the descrimination, applies a load "2" command to the register 7 via the line 108 while applying an increment command to the counter 34 via the line 110 to increment it by 1. The instruction D is fetched from the buffer 1.

(Fifth Cycle)

The counter 34 is incremented to "1" by the command on the line 110. The register 7 is loaded with "2" in response to the command on the line 108. Based on the data stored in the register 7, the condition-code-establishment decision unit 37 recognizes that the latest instruction for updating the condition code after phase III on the pipeline is to cause the generator 30 to generate a condition code. Since the counter 34 associated with the generator 30 is then holding "1", the decision unit 37 sees that a condition code has not been generated yet and, thereby, develops "0" on the line 156 as a condition code determination display.

The result of operation selected by the selector 31 is loaded in the register 36 under the control of the instruction A and, further, stored in the memory buffer 38.

The memory operand data read out of the cache memory 15 is loaded in the register 25 under the control of the instruction B, while the general purpose register operand is loaded in the register 24. The register 19 is loaded with the instruction code associated with the instruction B. In response to the instruction B, the controller 26 sends out "1" to the line 143 to instruct the logical operation unit 27 to perform an EOR operation, "1" to the line 141 to instruct the generator 29 to generate a condition code, and "3" to the line 140 to instruct the selector 31 to select an output of the unit 27. As a result, the unit 27 performs an EOR operation of the data stored in the registers 24 and 25, while the selector 31 selects the result of the operation. The generator 29, in response to the result of operation on the line 145, generates a condition code and sends it out over the line 148 to instruct the register 33 to store the condition code, while delivering a decrement command to the counter 32 via the line 147.

The register operand specified by the instruction C is loaded in the register 9, and the memory operand address is loaded in the register 11. The register 8 is loaded with an instruction code associated with the instruction C. The controller 12 outputs "2" on the line 118. Consequently, the selector 18 selects an output of the register 9.

The instruction D is set in the instruction register 2. Data stored in a general purpose register specified by the instruction is read out to calculate an address of the memory operand. The condition-code-updating instruction discrimination unit 4 determines that the instruction D is the ADDX instruction for updating the condition code and, as a result of the discrimination, delivers a load "2" command to the register 7 over the line 108 and an increment command to the counter 34 over the line 110.

The instruction E is fetched from the buffer 1.

(Sixth Cycle)

In response to the command on the line 108, the register 7 is loaded with "2" while, in response to the command on the line 110, the counter 34 is incremented by 1 to "2". The counter 32, on the other hand, is decremented by 1 to "0" by the command on the line 147. The register 33 is loaded with the condition code associated with the instruction B which was generated in the fifth cycle. Responding to the data stored in the register 7, the condition-code-establishment decision unit 37 sees that the latest instruction for updating the condition code after phase III on the pipeline is to cause the generator 30 to generate a condition code and, since the count of the counter 34 associated with the generator 30 is "2", recognizes that a condition code has not been generated yet, thereby delivering "0" to the condition-code-determination-indication-signal on the line 156.

The operation result selected by the selector 31 is loaded in the register 36 under the control of the instruction B and, further, in the memory buffer 38.

Concerning the instruction C, the memory operand read out of the cache memory 15 is loaded in the register 25 and the register operand, in the register 24. Stored in the register 19 is a instruction code associated with the instruction C. The controller 26 outputs "1" on the line 144 to instruct the arithmetic operation unit 28 to perform subtraction, "1" on the line 142 to instruct the generator 30 to generate a condition code, and "2" on the line 140 to instruct the selector 31 to select an output of the unit 28. As a result, a difference produced by subtracting the data in the register 25 from the data in the register 24 is output from the unit 28 and selected by the selector 31. Based on the output of the unit 28 appearing on the line 146, the generator 30 generates a condition code and delivers it to the register 35 via the line 150, while applying a decrement command to the counter 34 via the line 149.

The register operand designated by the instruction D is set in the register 9 and the address of the memory operand, in the register 11. The register 8 is loaded with an instruction code associated with the instruction D. The controller 12 produces "2" on the line 118 so that the selector 18 selects an output of the register 9.

The instruction E is set in the instruction register 2. Data stored in two general purpose registers designated by the instruction and read out of the memory register 5. The discrimination unit 4 determines that the instruction E is the ANDR instruction for updating the condition code and, as a result of the discrimination, applies a load "4" command to the register 7 via the line 108, and an increment command to the counter 20 via the line 111 to increase it by 1.

The instruction F is fetched from the instruction buffer 1.

(Seventh Cycle)

The register 7 is loaded with "4" in response to the command on the line 108, while the counter 20 is incremented to "1" in response to the command on the line 111. The counter 34 is decremented by 1 to hold "1" by the command on the line 149, while the register 35 is loaded with the condition code associated with the instruction C which was generated in the sixth cycle. The condition-code-establishment decision unit 37, in response to the data in the register 7, sees that the latest instruction for updating the condition code after phase III on the pipeline is to cause the generator 16 to generate a condition code and, since the count of the counter 20 associated with the generator 16 is "1", sees that a condition code has not been generated yet, thereby delivering "0" to the signal on the line 156.

The operation result selected by the selector 31 is loaded in the register 36 under the control of the instruction C and, further, in the memory buffer 38.

Concerning the instruction D, the memory operand read out of the cache memory 15 is set in the register 25, and the register operand in the register 24. The register 19 is loaded with an instruction code associated with the instruction D. The controller 26 develops "0" on the line 144 to instruct the arithmetic operation unit 38 to perform addition, "1" on the line 142 to instruct the generator 30 to generate a condition code, and "2" on the line 140 to instruct the selector 31 to select an output of the arithmetic operation unit 28. As a result, the data held in the registers 24 and 25 are added together and the resultant sum is selected by the selector 31. In response to the operation result appearing on the line 146, the generator 30 generates a condition code and delivers it to the register 35 via the line 150, while applying a decrement command to the counter 34 via the line 149.

The register operand designated by the instruction E is loaded in the registers 9 and 10. Loaded in the register 8 is an instruction code associated with the instruction E. The controller 12 develops "0" on the line 121 to instruct the logical operation unit 13 to carry out an AND operation, "1" on the line 119 to instruct the generator 16 to generate a condition code, and "1" on the line 118 to instruct the selector 18 to select an output of the operation unit 13. Consequently, the logical operation unit 16 performs an AND operation of the data stored in the registers 9 and 10 and the selector 18 selects it. The condition code generator 16 responds to the output on the line 126 by generating a condition code and delivering it over the line 130 to the register 21 and, at the same time, applying a decrement command to the counter 20 to decrement it by 1.

The instruction F is loaded in the instruction register 2. The discrimination unit 4 determines that the instruction F is the BCX instruction which is not to update a condition code, and thus no set command is sent to the register 7 and no increment command is sent to the counters 20, 22, 32 and 34. The branch decision unit 3, on the other hand, decides that the instruction F is the BCX instruction and refers to the condition code determination display on the line 156. Since the condition code determination decision unit 37 has output "0" on the line 156, the branch decision unit 3 develops "1" on the line 106 which represents a hold command to the register 2 and buffer 1.

(Eighth Cycle)

The counter 34 is decremented by 1 to "0" by the command appearing on the line 149. The register 35 is loaded with the condition code associated with the instruction D which was generated in the seventh cycle. The counter 20 is also decremented by 1 by the command on the line 129 to hold "0". The register 21 is also loaded with the condition code of the instruction E which was generated in the seventh cycle. The decision unit 37, in response to the register 7, sees that the latest instruction for updating the condition code after phase III on the pipeline is to cause generator 16 to generate a condition code. Since the count of the counter 20 associated with the generator 16 is "0", the decision unit 37 recognizes that a condition code to be generated by the latest condition code update instruction has already been determined. Then, the decision unit 37 applies "1" to the condition code determination display on the line 156 and, at the same time, routs the data stored in the register 21 associated with the generator 16 to the line 157 as a determined condition code.

Under the control of the instruction D, the result of the operation selected by the selector 31 is loaded in the register 36 and, further, in the memory buffer 38.

Under the control of the instruction E, the result of the operation produced in the cycle 7 is loaded in the register 24. The register 19 is loaded with the instruction code associated with the instruction E, while the controller 26 develops "1" on the line 140. As a result, the selector 31 selects an output of the register 24.

Since a hold command has appeared on the line 106 from the branch decision unit 3 under the control of the instruction F, the instruction F is held in the register 2 to maintain is at phase II. The unit 3 recognizes that the instruction held in the instruction register via the line 102 is the BCX instruction and, then, refers to the signal on the line 156. Since the decision unit 37 has developed "1" on the line 156, the branch decision unit 3 develops "0" on the line 106 to cancel the hold command to the instruction register 2 and instruction buffer 1. Simultaneously, the branch decision unit 3 decides whether or not to execute branching based on the determined condition code which is appearing on the line 157, applying a result of the decision to the line 107. By the above operation, conditional branching is effected whereafter the next instruction, G, which will be executed depending upon the result of the conditional branching enters phase I and is fetched from the instruction buffer 1.

In the nineth cycle and onward, too, the operation described hereinabove occurs.

Although in the embodiment shown and described the execution time associated with the conditional branch instruction F eventually extends over two cycles, this is not a problem compared to a system which does not adopt the present invention. If, as with a system not adapting the present invention, no means is available for determining whether or not a condition code has been determined, even if an instruction capable of generating a condition code in phase III, e.g. instruction A or E, has determined a condition code in phase IV, it cannot be referred to. Therefore, concerning a conditional branch instruction which refers to a condition code, a branch decision cannot be effected until the immediately preceding instruction enters phase V in which an instruction for updating a condition code establishes a condition code without fail. This, in relation with the embodiment described, would require an apparent execution time of three cycles which terminates when the immediately preceeding instruction E enters phase V.

In the particular embodiment shown and described, since it is in phase II that the BCX instruction expected to refer to a condition code does so, the condition-code-updating-instruction discrimination unit 4 is installed in phase II, and a register for holding a result of descrimination in phase III. Alternatively, to accommodate even an instruction which refers to a condition code in phase III such as one instructing addition of a condition code and a general purpose register, there may additionally be employed a condition code-updating-instruction discrimination unit 4 in phase III, a register for holding a result of discrimination in phase IV, counters associated respectively with the condition code generators, and a condition-code-establishment decision unit adapted to receive outputs of the additional counters. This makes it possible to see, in phase III, whether a condition code has been established by the latest condition code update instruction which appears in or after phase IV.

While four condition code generators have been used in the embodiment shown and described, only one condition code generator may be employed with the system of the present invention without deteriorating the achievable effect. Therefore, the present invention is also effectively applicable to an information processing system of the type to which operation units and condition code generation units can be added on an optional basis.

Further, the invention is applicable even to a PIP system in which, despite the same condition code generator being designated by the discrimination unit 4, the time between the instant when which one of the condition code generators is to be used is determined and the instant when the determined condition code generator actually establishes a condition code depends upon the used condition code generator, is not constant. In such a system, when no operand data is present in the cache memory 15 in phase III, waiting is required in phases I and II until operand data are supplied, resulting in disturbance in the flow of the pipeline. A possible expedient for absorbing the disturbance is installing buffer registers corresponding to the registers 8, 9, 10 and 11 between the phases II and III. In accordance with another possible expedient, in a PIP system of the kind wherein an instruction exists which requires a plurality of cycles for executing an operation in phase IV, an instruction may be supplied once for each cycle and the waiting in the pipeline to the instant when the next instruction is allowed to use phase IV is performed by the buffer registers.

What is claimed is:

1. A pipeline-oontrolled information processing system for executing programmed instructions, comprising:
   means for providing instructions;
   a plurality of operation units for performing operations in response to said instructions;
   a plurality of condition code generator units connected to said operation units for monitoring operations performed by said operation units and generating condition codes in response to said operations, each condition code generator unit having a counter section and an operating section for operating said counter section in the event of generation of a condition code;

a condition-code-updating instruction discrimination unit connected to said condition code generator units and including means for determining one of said condition code generator units to be used to generate a condition code in response to each of said instructions, and means responsive to said determining means for actuating the counter section of said determined generator unit to produce a count; and a condition-code-establishment decision unit connected to said condition code generator units and including means for monitoring counts held by the plurality of counter sections and means responsive to said monitoring means for producing a signal indicative of the generation of an updated condition code of the determined condition code generator unit and the updated condition code if an updated condition code has been generated by the determined condition code generator unit.

2. A pipeline-controlled information processing system, comprising:

means for holding a plurality of instructions to be executed;

means for sequentially fetching said instructions to be executed from said holding means, certain of said instructions requiring that a predetermined condition code be present prior to execution, and certain of said instructions causing a condition code to be generated as a result of their execution;

means for executing said instructions;

a plurality of condition code generator units connected to said executing means for generating condition codes in response to execution of said instructions causing generation of condition codes;

means connected to said fetching means and being responsive to said sequentially fetched instructions for individually determining which of said instructions is to cause generation of a condition code, and which of said condition code generator units is to generate a condition code for each of said determined instructions;

means for monitoring the determined condition code generator unit, deciding when a valid condition code has been generated by the monitored determined unit and producing a signal indicative of a generated valid condition code; and decision circuit means connected to said fetching means for deciding which of said instructions requires the presence of a condition code prior to being executed, said decision circuit means being connected to receive said signal indicative of a generated valid condition code from said monitoring means and being connected to inhibit said fetching means when a next sequentially instruction requires the presence of a valid condition code and said signal indicative of a generated valid condition code is not present.

3. A system as set forth in claim 2 wherein each of said condition code generator units comprises a connected means to be set by said determining means to indicate that the connected condition code generating means has been determined, and reset when a valid condition code has been generated by the connected condition code generating means.

4. A system as set forth in claim 3 wherein said means for being set and reset comprises a counter which is increased when set and decressed when reset.

5. A system as set forth in claim 3 further wherein each of said condition code generator units comprises a register for storing a condition code.

6. A system as set forth in claim 5 wherein said monitoring means receives inputs from each of said means to be set and reset and from each of said registers for storing a condition code.

7. A system as set forth in claim 2 including at least two registers for holding data, and at least one logical operation unit for operating on said data in said two registers under control of said instructions fetched by said fetching means for producing a logical output, one of said condition code generators being responsive to said logical output for producing a condition code.

8. A system as set forth in claim 7 further including at least one arithmetic operation unit for performing arithmetic operations under control of said instructions on data stored in said two registers to produce an arithmetic output, one of said condition code generators being responsive to said arithmetic output to produce a condition code.

9. A system as set forth in claim 2 wherein each of said instructions includes a portion forming an instruction code to indicate a predetermined operation to be carried out, and includes a portion indicating the location of data to be operated on, and wherein said system includes operation units for carrying out said operations indicated by said instruction codes, said condition code generator units being connected, respectively, with said operation units, said operations indicated by said instruction codes being defined as either causing generation of a condition code or not causing operation of a condition code, said determining means comprising a condition code updating instruction discriminating unit which receives said instruction code from each instruction, determines whether an instruction causes generation of a condition code, and in response to determining that an instruction causes generation of a condition code, transmits a signal to said monitoring means indicating one of said condition code generator units connected with one of said operation units which will carry out the operation designated by said determined instruction code.

10. A system as set forth in claim 9 wherein said descision circuit also receives said instruction code from each instruction, and, in response to instructions requiring a condition code prior to being executed, passes said signal from said monitoring means to said fetching means to cause said inhibiting of said fetching means.

11. A method of operating a pipeline controlled information processing system, comprising:

storing a plurality of instructions having instruction codes defining operations to be performed by said system, each instruction code containing an indication of whether a respective operation requires a condition code prior to being executed and whether each respective operation produces a condition code update during its execution;

sequentially fetching said stored instructions, each instruction including one of said instruction codes;

examining each fetched instruction in order and determining whether, when executed, the operation indicated by the instruction code of the fetched instruction produces a condition code update or requires a condition code to be generated by a preceding instruction before execution;

for each instruction determined to produce a condition code during execution, executing said determined instruction and producing a condition code during execution of said determined instruction; and for each instruction requiring a condition code prior to being executed, inhibiting execution, monitoring the condition code status of a preceding instruction determined to produce a condition code, and proceeding with execution when the required condition code is generated.

12. A method as set forth in claim 11 wherein said step of monitoring comprises monitoring the condition code status of an immediately preceding instruction which produces a condition code.

13. A method as set forth in claim 11 wherein said step of producing a condition code includes producing both a condition code and a signal indicating that the produced condition code is valid.

* * * * *